United States Patent
Osterberg

(10) Patent No.: US 12,124,395 B2
(45) Date of Patent: Oct. 22, 2024

(54) ADAPTIVE MODULE PORT AND CIRCUITRY

(71) Applicant: Net Insight AB, Solna (SE)

(72) Inventor: Magnus Osterberg, Hagersten (SE)

(73) Assignee: Net Insight AB, Solna (SE)

( * ) Notice: Subject to any disclaimer, the term of this patent is extended or adjusted under 35 U.S.C. 154(b) by 67 days.

(21) Appl. No.: 17/797,930

(22) PCT Filed: Jan. 29, 2021

(86) PCT No.: PCT/EP2021/052099
§ 371 (c)(1),
(2) Date: Aug. 5, 2022

(87) PCT Pub. No.: WO2021/156147
PCT Pub. Date: Aug. 12, 2021

(65) Prior Publication Data
US 2023/0061937 A1    Mar. 2, 2023

(30) Foreign Application Priority Data

Feb. 7, 2020  (SE) .................................. 2050131-8

(51) Int. Cl.
*G06F 13/40* (2006.01)
*G06F 13/38* (2006.01)

(52) U.S. Cl.
CPC ................................ *G06F 13/4081* (2013.01)

(58) Field of Classification Search
CPC ........................... G06F 13/4081; G06F 13/387
(Continued)

(56) References Cited

U.S. PATENT DOCUMENTS 5,440,755 A * 8/1995 Harwer .................. H05K 1/14
710/105
6,829,658 B2 * 12/2004 Beauchamp .......... G06F 13/387
710/16
(Continued)

FOREIGN PATENT DOCUMENTS

EP         2163992 A2      3/2010

OTHER PUBLICATIONS

International Search Report for International Application No. PCT/EP2021/052099 dated May 26, 2021.
(Continued)

*Primary Examiner* — Idriss N Alrobaye
*Assistant Examiner* — Henry W Yu
(74) *Attorney, Agent, or Firm* — Harness, Dickey & Pierce, P.L.C.

(57) ABSTRACT

The present invention relates to methods for enabling use of a pluggable module in a host system, regardless of the type of pluggable module used in view of the module ports of the host system, which is realized using an adaptation device. The disclosure also relates to corresponding devices; adaptation devices and host systems. The methods comprise inserting a pluggable module in a module port of a host system, obtaining information indicating an electrical interface of pluggable module and setting a mode of operation of the adaptation device for re-routing and adapting signals to/from the pluggable module towards one or more controlling entities of the host system based on the electrical interface of the pluggable module.

15 Claims, 7 Drawing Sheets

(58) Field of Classification Search
USPC ............ 710/2, 8, 11, 14, 16, 31, 38, 62, 302
See application file for complete search history.

(56) References Cited

U.S. PATENT DOCUMENTS

| | | | | |
|---|---|---|---|---|
| 7,634,375 | B1 * | 12/2009 | Pakzad | G11B 25/043 |
| | | | | 710/36 |
| 7,934,032 | B1 * | 4/2011 | Sardella | G06F 13/4022 |
| | | | | 710/316 |
| 9,385,814 | B2 * | 7/2016 | Blumenthal | H04B 10/40 |
| 2002/0198024 | A1 * | 12/2002 | Sakurai | G06F 13/387 |
| | | | | 455/463 |
| 2010/0011128 | A1 * | 1/2010 | Paycher | G06F 13/385 |
| | | | | 710/1 |
| 2010/0191879 | A1 * | 7/2010 | Pomerantz | G06F 13/387 |
| | | | | 710/73 |
| 2012/0233368 | A1 * | 9/2012 | Alshinnawi | G06F 13/387 |
| | | | | 710/301 |
| 2013/0046916 | A1 | 2/2013 | Dudemaine et al. | |
| 2014/0248059 | A1 | 9/2014 | Tang et al. | |
| 2015/0086211 | A1 | 3/2015 | Coffey et al. | |
| 2015/0113176 | A1 | 4/2015 | Tang et al. | |
| 2016/0154391 | A1 * | 6/2016 | Pavaskar | H04L 41/0803 |
| | | | | 701/3 |
| 2017/0338896 | A1 * | 11/2017 | Zhang | H04B 10/801 |
| 2018/0116063 | A1 * | 4/2018 | Tracy | H05K 7/02 |

OTHER PUBLICATIONS

Written Opinion for International Application No. PCT/EP2021/052099 dated May 26, 2021.

* cited by examiner

| Pin nr. | Signal SFP (MSA) | Signal SFP+ (MSA) | Signal SFP/VSFP (non-MSA) | Need re-routing and/or adaption. | Host system FPGA or ASIC signal alternatives |
|---|---|---|---|---|---|
| 1 | VeeT | VeeT | VeeT | NO | n/a |
| 2 | TX Fault | TX Fault | RX2- | YES | TX Fault / RX2- |
| 3 | TX Disable | TX Disable | RX2+ | YES | TX1 DIS / RX2+ |
| 4 | MOD-DEF2 | SDA | Vee | YES | SDA / none |
| 5 | MOD-DEF1 | SCL | SCL | NO | SCL |
| 6 | MOD-DEF0 | Mod_ABS | SDA | YES | *PRESENT / SDA |
| 7 | Rate Select | RS0 | Vee | YES | RS0 / none |
| 8 | LOS | LOS | TX2- | YES | LOS / TX2- |
| 9 | VeeR | RS1 | TX2+ | YES | none / TX2+ |
| 10 | VeeR | VeeR | TX2_DIS | YES | None / TX2_DIS |
| 11 | VeeR | VeeR | Vee | NO | n/a |
| 12 | RD- | RD- | RD1- | NO | RD1- |
| 13 | RD+ | RD+ | RD1+ | NO | RD1+ |
| 14 | VeeR | VeeR | Vee | NO | n/a |
| 15 | VccR | VeeR | Vcc | NO | n/a |
| 16 | VccT | VccT | Vcc | NO | n/a |
| 17 | VeeT | VeeT | Vee | NO | n/a |
| 18 | TD+ | TD+ | TD1+ | NO | TD1+ |
| 19 | TD- | TD- | TD1- | NO | TD1- |
| 20 | VeeT | VeeT | TX1_DIS | YES | none / TX1_DIS |

Figure 6

ADAPTIVE MODULE PORT AND CIRCUITRY

CROSS-REFERENCE TO RELATED APPLICATIONS

This application is a national phase under 35 U.S.C. § 371 of PCT International Application No. PCT/EP2021/052099 which has an International filing date of Jan. 29, 2021, which claims priority to Swedish Application No. 2050131-8, filed Feb. 7, 2020, the entire contents of each of which are hereby incorporated by reference.

TECHNICAL FIELD

The present invention relates to the field of signal transmission. More particularly, the proposed technique relates to methods for enabling use of a pluggable module in a host system, regardless of the type of pluggable module used in view of the module ports of the host system, which is realized using an adaptation device. The disclosure also relates to corresponding devices; adaptation devices and host systems.

BACKGROUND OF THE INVENTION

Host systems for communication, such as network switches and routers, often utilizes pluggable module ports with an electrical host interface as a mean to connect external optical or electrical signals, e.g. via the use of pluggable modules, or uses the module port as an optional replaceable functional module for signal processing or other functions. Several different pluggable module types have evolved, such as Small Form-factor Pluggable (SFP), SFP+, SFP28, Quad Small Form-factor Pluggable (QSFP), QSFP28 etc. Some families of modules share the same mechanical outline and electrical connector but defines inherently incompatible sets of electrical signals in the connector where these has changed to encompass new functions or uses for the module. An example of such family is SFP modules which can be either of a type using Multi Source Agreement (MSA) pinout or non-MSA pinout, where the latter is adapted for Serial Digital Interface (SDI) signaling to a version called Video-SFP (VSFP) comprising dual receive (Rx) and transmit (Tx) channels. A host system where it is desirable to use both of these module types, such as a video router handling both ethernet and SDI signals, thus require specific hardware with module ports for each pinout on the host systems, or replacement of module specific line cards, in order to fit both types of modules, which is an impractical and expensive solution.

SUMMARY OF THE INVENTION

An object of the present disclosure is to provide methods and devices which seek to mitigate, alleviate, or eliminate the above-identified deficiencies in the art and disadvantages singly or in any combination. This object is obtained by a method for for enabling use of a pluggable module in the host system, wherein the host system comprises an adaptation device, the method comprising: inserting a pluggable module in a module port of a host system, obtaining information indicating an electrical interface of the pluggable module, and setting a mode of operation of the adaptation device for re-routing and adapting signals to/from the pluggable module towards one or more controlling entities of the host system based on the electrical interface of pluggable module.

According to some aspects, the method further comprises transceiving to/from the pluggable module towards one or more controlling entities of the host system via the adaptation device using the set mode of operation of the adaptation device. In some embodiments obtaining information indicating an electrical interface of the pluggable module comprises obtaining information indicating the electrical interface of the pluggable module by detecting a characteristic pin property, set pinout or electrical signal set of the pluggable module using a detection circuitry. In some aspects, detecting characteristic pin property of the pluggable module includes detection of characteristic signal pins in the module, such as power pins or signal pins, at which a difference in AC or DC resistance can be measured by the detection circuitry. In a further aspect, setting a mode of operation of the adaptation device for re-routing and adapting signals to/from the pluggable module towards one or more controlling entities of the host system based on the electrical interface of the pluggable module comprises setting the mode of operation of the adaptation device using the detection circuitry. In a further aspect, the method further comprises indicating to the host system that a pluggable module has been inserted, the electrical interface of the pluggable module inserted, and the set mode of operation of the adaptation device. In another aspect, the detection circuitry instead indicates the electrical interface type of module to the host system, which sets the mode of operation.

In other embodiments, obtaining information indicating an electrical interface of the pluggable module comprises obtaining information indicating the electrical interface of the pluggable module by reading an internal memory of the pluggable module indicating a type of pluggable module and correlating the type of pluggable module to an electrical interface of the pluggable module, where the internal memory is read by a controlling entity of the host system. In some aspects, setting a mode of operation of the adaptation device for re-routing and adapting signals to/from the pluggable module towards one or more controlling entities of the host system based on the electrical interface of the pluggable module comprises setting by the host system a mode of operation for the adaptation device. In a further aspect, setting a mode of operation of the adaptation device for re-routing and adapting signals to/from the pluggable module towards one or more controlling entities of the host system based on the electrical interface of the pluggable module comprises setting, by the host system, a mode of operation for the adaptation device.

In some embodiments are provided an adaptation device, comprising processing circuitry configured to perform the methods mentioned above. An adaptation device is provided, comprising processing circuitry configured to enable use of a pluggable module in a host system, and being capable of re-routing and adapting signals from a pluggable module inserted into a module port of the host system to at least one controlling entity of the host system, the device comprising a communication interface and processing circuitry comprising detection circuitry and adaptation circuitry configured to cause the adaptation device to obtain information indicating an electrical interface of the pluggable module being inserted into a module port of a host system, and to set a mode of operation for the adaptation circuitry for re-routing and adapting signals to/from the pluggable module towards one or more controlling entities of the host system based on the indicated electrical interface of the pluggable module. In some aspects, the processing circuitry is further configured to transceive to/from the pluggable module towards a controlling entity of the host system using the set mode of operation of the adaptation device.

In some embodiments, to obtain information indicating an electrical interface of the pluggable module being inserted into a module port of a host system may comprise to obtain information indicating the electrical interface of the pluggable module by detecting a characteristic pin property of the pluggable module using the detection circuitry. To detect characteristic pin property of the pluggable module may include to detect characteristic signal pins in the module, such as power pins or signal pins, at which a difference in AC or DC resistance may be measured by the detection circuitry. To set a mode of operation of the adaptation device for re-routing and adapting signals to/from the pluggable module towards one or more controlling entities of the host system based on the electrical interface of the pluggable module may comprise to set the mode of operation of the adaptation device using the detection circuitry. The processing circuitry may further be configured to indicate to the host system that a pluggable module has been inserted and the electrical interface of the pluggable module inserted.

In some embodiments, to obtain information indicating an electrical interface of the pluggable module being inserted into a module port of a host system comprises to obtain information indicating the electrical interface of the pluggable module by reading, using a controlling entity of the host system, an internal memory of the pluggable module indicating a type of pluggable module and to correlate the type of pluggable module to an electrical interface of the pluggable module. To set a mode of operation of the adaptation device for re-routing and adapting signals to/from the pluggable module towards one or more controlling entities of the host system based on the electrical interface of the pluggable module may comprise to set, using the controlling entity of the host system, a mode of operation for the adaptation device.

In some embodiments, the present disclosure comprises a host system comprising the adaptation device mentioned above. In one aspect, the host system further comprises one or more module ports and one or more host controlling entities.

In a further embodiment is provided a pluggable module comprising the adaptation device described above.

Further objective of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 6 is a table showing the pinouts for SFP(MSA), SFP+(MSA), VSFP (non-MSA), and the need for re-routing and adapting signals based on these.

Figure 1:
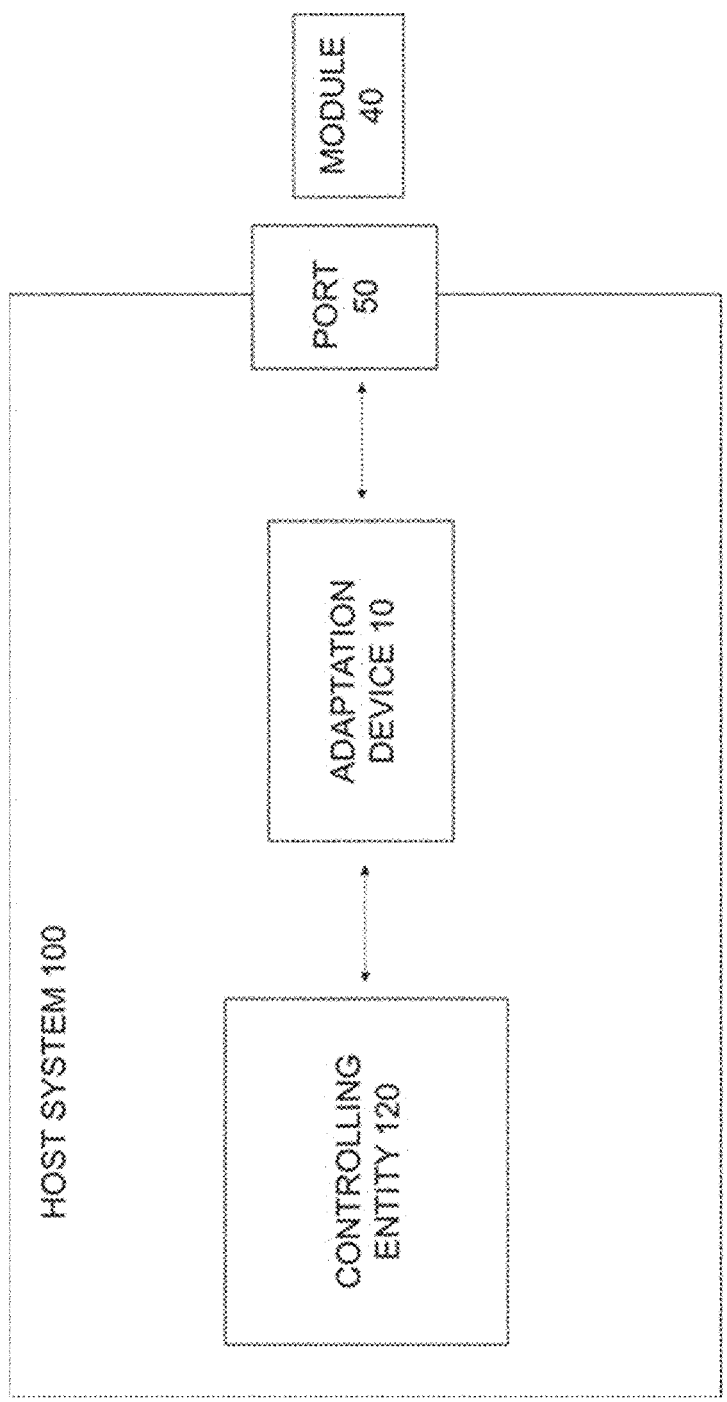
FIG. 1 illustrates a generic embodiment of the invention by depicting a host system comprising a module port and a controlling entity, with an adaptation device re-routing and adapting the signals between a pluggable module inserted in the module port and a controlling entity of the host system.

All the figures are schematic, not necessarily to scale, and generally only show parts which are necessary in order to elucidate the invention, wherein other parts may be omitted or merely suggested.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some embodiments a non-limiting term "host system" is used. The host system herein can be any type of host system capable of communicating with a network, such as a host computer, network gateway, network switch, a router or a video router.

Figure 4:
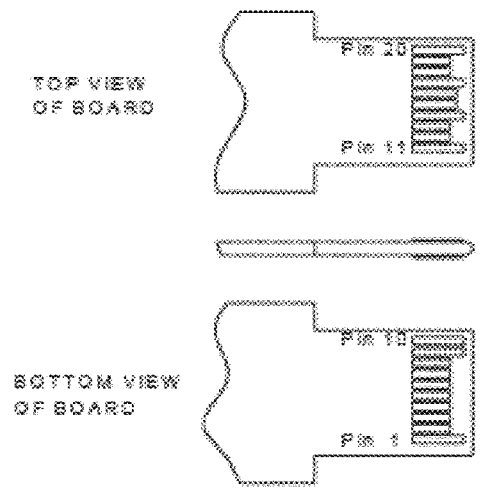
FIG. 4 is showing the host interface connector used for SFP, SFP+, VSFP.

The term "module port" refers to a physical port of the host system where a pluggable module may be inserted. In some aspects, the module port comprises a module interface. The term "module interface" or "module port interface", used interchangeably herein, refers to the interface between the module port and the host system or host interface, and comprises a mechanical interface and an electrical interface towards the host system, where the electrical interface comprises electrical signal sets and pinouts. In some aspects, the mechanical interface of the module port comprise a physical structure, a pluggable module cage, and a host interface connector, where the term "host interface connector" refers to the physical interface between the pluggable module and the host system, which may be implemented by the module port. Examples of host interface connectors of pluggable modules of the types SFP, SFP+, and VSFP are shown in FIG. 4. The term "adaptation device" refers to a structure which is able to physically adapt and re-route signals from a pluggable module towards a host system controlling entity and vice versa. In some aspects, the adaptation device comprise processing circuitry and a communication interface. The processing circuitry may be comprised of a "detection circuitry" and an "adaptation circuitry", which may be two separate entities in communication with each other or one integrated circuitry. The detection circuitry may detect a type of pluggable module inserted based on the pin characteristics of the module, and set a mode of operation of the adaptation device accordingly. The adaptation circuitry may then use said mode of operation to re-route and adapt signals between a pluggable module and controlling entities of a host system. The adaptation device may thus refer to a circuitry, which may be comprised within a host system, and which physically re-routes and adapts the signals from the pluggable module via the host interface connector towards the controlling entities in the host system, and vice versa (from the controlling entities in the host system towards the pluggable module). The adaptation circuitry is sometimes referred to as the "re-routing and adaptation circuitry", which is used interchangeably herein.

By "re-routing" using the adaptation device or circuitry is meant that the device or circuitry is capable of re-routing signals to appropriate pins on the host interface connector of the system according to the type of module interface pinout that is selected from a range of pinouts that the circuit is specifically designed for. Alternatively, the device or circuitry may include the capacity to re-route high speed signals and/or low speed or static signals to/from a same connector pin on the module to/from a host system controlling entity, typically a central processing unit (CPU), which may be separate or comprised in further device, such as an ASIC or FPGA device on the host system. The re-routing performed by the adaptation device comprises to physically re-route the signals. This physical re-routing may for example be performed through a switch which physically switches the signal, such as semiconductor switch or an electromagnetic switch. Another example of physically re-routing the signals is to separate the high speed and slow-speed (static) signals by having two branches or paths, where one branch is AC-coupled and the other is DC-coupled. Thus, the re-routing may either be implemented using switching devices, either solid state or electromechanical etc., or by separation of high speed and low speed signals into different signal paths, one with AC-coupling and a second with DC-coupling. Thus, it would be obvious for a person skilled in the from the present disclosure to implement the current invention as described above, and that the implementation of re-routing can utilize different AC and DC signal paths, relays, solid state switches, enable and disable of drivers, multiplexers or any combination thereof or use of similar solutions.

By "adaptation" using the adaptation device/circuitry is meant that the device/circuitry include means to perform signal level adaption, such as signal amplitude and/or envelope adaptation, between the pluggable module and the host system controlling entities, e.g. CPU, ASIC or FPGA.

By "mode of operation" is meant both the re-routing and adaption mentioned above. Hence, the mode of operation of the adaption device indicates if and how the signals should be re-routed and/or adapted when transceiving using the pluggable module, e.g. transceiving between the pluggable module and the controlling entities of the host system via the adaptation device. The mode of operation, e.g. type of adaptation and re-routing performed, may be based on the type of host system and the electrical interface of the pluggable module. Thus, some predetermined modes of operation may exist, based on the combination of the electrical interface of the pluggable module and the host system. Which adaptation and re-routing (mode of operation) that would be needed in each specific case would be obvious to a person skilled in the art.

The term "pluggable module" refers to a physical transceiver, receiver or transmitter module that may be plugged into a module port of a host system. A "module family" refers to related pluggable modules that may have the same module port interface (mechanical and electrical interface) towards the host (host interface), for example the SFP-family of modules, where the "module type" is the type within the family, e.g. SFP vs SFP+. SFP and SFP+ have the same mechanical interface, the same pinout but with an altered function of pin 9, as shown in the table in FIG. 6. Modules may thus be considered as members of the same family if they are built upon each other as different generations of the same concept, and may be developed by the same consortium. Typically, a development of the module to reach increased speeds give rise to a new module within a family, and some type of backwards compatibility between the family members is often expected.

The term "pinout" refers to a cross-reference between the contacts, or pins, of an electrical connector or electronic component, and their functions. The pinout can typically be shown as a table or a diagram.

The term "electrical interface" refers to the pinout and electrical signal set of a certain type of module. Modules having different electrical interfaces may be used in the invention regardless of the host system interface due to the implementation of the adaptation device. The electrical interface of a pluggable module may either be directly obtained or detected using the detection circuitry, which may then set a mode of operation, or it may be obtained by first obtaining an indication of the type of module by reading an internal memory of the pluggable module using a controlling entity of the host system, where the type of module may be used to then obtain the electrical interface of the pluggable module. The type of module may for example be indicated by reading, using a controlling entity, an index number indicating a type of pluggable module or by reading an article number of the pluggable module. The electrical interface may be obtained by using a lookup table stored in the memory of the controlling entity, where the type of module, index number or article number can be correlated to an electrical interface of the pluggable module.

In host systems for communication using pluggable module ports, it is often desirable to use different module types, which require specific hardware with module ports for each pinout on the host systems, or replacement of module specific line cards, in order to fit different types of modules, which is an impractical and expensive solution.

In view of the above identified problem, the object of the present invention is to implement a type of module port which accepts different types of modules with different electrical interface (different signal set and pinout) of the host interface to be used in the same physical port on a host system or line card, thereby allowing for the host system to utilize all available module types in all available ports regardless of otherwise incompatible interfaces of said modules. The current disclosure thus provides solutions to the above-mentioned problems and drawbacks by providing an adaptation device which physically re-routes and adapts signals from a pluggable device, so that it becomes compatible with any controlling entity of a host system. The adaptation device of the present disclosure detects the module port interface of the inserted module, i.e. the interface between the module port and the host system or host interface, and applies an adaption of only the physical layer of the module port interface towards the pluggable module, thus being independent of all other aspects such as external interface type of the pluggable module (electrical or optical etc.), or type of protocol (Ethernet, Fiber channel, SDI etc.) or other specific hard or soft features of the module. Hence, other method that implements adaption of the signaling to/from pluggable modules by detecting supported transport protocols or similar features are distinct from the proposed method and device of the invention. A more close solution would be to implement yet another physical adapter module between the module port of the host and the pluggable module, which would enable insertion of other types of modules in the port than the ones the port was designed for, but would thus require yet another physical module, maybe several for the different module types, which would be ineffective, require further logistics and be more expensive and cumbersome than the proposed solution of the present disclosure.

Host systems for communication, such as network switches and routers, often utilizes pluggable module ports with an electrical host interface (electrical interface of the module towards the host) as a mean to connect external optical or electrical signals. The module port may also be used as an optional replaceable functional module for signal processing or other functions.

Pluggable modules, i.e. modules capable of being plugged in into something else such as a host system (host computer, network switch or router etc.) may be used as a physical adapter between the host system and a cable, e.g. a fiber optic cable or a copper cable, so that cables of different properties may be plugged into the host system supporting e.g. different communication standards. Thus, the pluggable modules are transceivers which act as physical adapters between the host system and the cable, and which are used for data communication applications. These small metal devices plug into a special switch slot and support communication over either fiber optic or copper networking cable.

The pluggable modules may be hot-pluggable, which means that they may be used for hot-swapping or hot-plugging, which refers to replacing or adding components without stopping or shutting down the system, and to the addition of components that would expand the system without significant interruption to the system, respectively.

Most modern hot pluggable/hot-swap methods use a specialized connector with staggered pins, so that certain pins are certain to be connected before others. Most staggered-pin designs have ground pins longer than the others, ensuring that no sensitive circuitry is connected before there is a reliable system ground. The other pins may all be the same length, but in some cases three pin lengths are used so that the incoming device is grounded first, data lines connected second, and power applied third, in rapid succession as the device is inserted. Pins of the same nominal length do not necessarily make contact at exactly the same time due to mechanical tolerances, and angling of the connector when inserted.

Several different module types to be used as physical adapters between the host system and the optical cables have evolved. One such example is Small Form-factor Pluggable (SFP), where the Form-factor is an aspect of hardware design which defines and prescribes the size, shape, and other physical specifications of components, particularly in consumer electronics and electronic packaging. SFP is a hot-pluggable transceiver that plugs into the SFP port of a network switch and supports SONET (Synchronous optical networking), Gigabit Ethernet, Fibre Channel, and other communications standards. SFP specifications are based on IEEE802.3 and SFF-8472. They are capable of supporting speeds up to 4.25 Gbps. Due to its smaller size, SFP replaces the formerly common gigabit interface converter (GBIC). By choosing different SFP modules, the same electrical port on the switch can connect to different fiber types (multimode or single-mode) and different wavelengths. In small size fiber optic network building, SFP transceivers play an important role. There are various types of SFP transceivers on the market, such as 1000BASE-SX SFP, 1000BASE-LX/LH SFP, 1000BASE-T copper SFP.

The SFP transceiver is not standardized by any official standards body, but rather is specified by a multi-source agreement (MSA) among competing manufacturers. The SFP was designed after the GBIC interface, and allows greater port density (number of transceivers per given area) than the GBIC, which is why SFP is also known as mini-GBIC. The SFP transceiver contains a printed circuit board with an edge connector with 20 pads that mate on the rear with the SFP electrical connector in the host system. The QSFP has 38 pads including 4 high-speed transmit data pairs and 4 high-speed receive data pairs.

Another module type is SPF+, which supports higher data rates than SFP. Since SFP supports only up to 4.25 Gbps, SFP+ that supports data rates up to 16 Gbps was later introduced. In fact, SFP+ is an enhanced version of the SFP. The SFP+ specifications are based on SFF-8431. In most applications today, the SFP+ module usually supports 8 Gbit/s Fibre Channel, 10 Gigabit Ethernet and Optical Transport Network standard OTU2. In comparison to earlier 10 Gigabit Ethernet XENPAK or XFP modules, SFP+ module is smaller and becomes the most popular 10 Gigabit Ethernet module in the market. Normally, SFP module plugs into SFP port of the switch and SFP+ module plugs into SFP+ port of the switch. But, sometimes SFP module can also be plugged into SFP+ port. Which SFP or SFP+ module should you choose all depends on your switch types.

A slightly larger related module is the four-lane Quad Small Form-factor Pluggable (QSFP). The additional lanes allow for speeds 4 times their corresponding SFP. In 2014, the QSFP28 variant was published allowing speeds up to 100 Gbit/s. In 2019, the closely related QSFP56 was standardized doubling the top speeds to 200 Gbit/s with products already selling from major vendors.

In addition to these, there exists a kind of SFP transceiver which is mainly used in video transmission, a video SFP transceiver which is also known as Serial Digital Interface (SDI) SFP. Video SFP (V-SPF) transceivers are also referred to as digital video transceivers or SDI video transceivers. They are small, hot-pluggable transceiver modules, working with fiber optic cables. The reason for using an SDI video SFP transceiver is the rapid evolution of the broadcast video transport for high-capacity HD and ultra-high-definition (UHD) digital transmission, thus it is necessary to produce a kind of fiber optic transceiver that can achieve high performance level in video image transmission. With SDI interface, video SFP transceiver is able to support SDI video pathological signal and ensure the quality of video transmission. Video SFP transceivers can be classified into various types according to different aspects. Divided by operating rate, there are 3G-SDI SFP, 6G-SDI SFP, 12G-SDI SFP; by transceiver type, there are dual transmitters, dual receivers, single transmitter, single receiver, or a transceiver; by compliant standards, there are MSA and non-MSA; by operating wavelength, there are 850 nm, 1310 nm, 1490 nm, 1550 nm and CWDM wavelength; by transmission distance, there are 300 m, 2 km, 10 km, 20 km, 40 km.

In the prior art, different types of modules (e.g. SFP or SFP+) will need a different module port. Some families of modules share the same mechanical outline and electrical connector within the module family, but defines inherently incompatible sets of electrical signals in the connector where these has changed to encompass new functions or uses for the module. An example of such family is SFP modules which can be types either using Multi Source Agreement (MSA) pinout or non-MSA pinout, where the latter is adapted for SDI signaling to a version called VSFP comprising dual Rx and Tx channels. A host system where it is desirable to use both of these module types, such as a video router handling both ethernet and SDI signals, thus require specific hardware with module ports for each pinout on the host systems, or replacement of module specific line cards, in order to fit both types of modules. Since this is impractical and cost inefficient, implementation of a type of module port which accepts different types of modules with different electrical interface (different signal set and pinout) of the host interface to be used in the same physical port on a host system or line card, thereby allowing for the host system to utilize all available module types in all available ports regardless of otherwise incompatible interfaces of said modules, is desired.

A module port of a host system typically implements a host interface connector mechanically compatible to a specific module family. All signals to/from this connector to the controlling entities of the host system, the central processing unit (CPU), the system Field Programmable gate Arrays (FPGA) or Application Semiconductor specific Integrated Circuit (ASIC), as well as to/from other controlling entities in the host system, are routed through a re-routing and adaption device, such as a re-routing and adaption circuitry. This circuitry, also referred to as adaptation circuitry, is capable of re-routing the signals to appropriate pins on the host interface connector of the system according to the type of module interface pinout that is selected from a range of pinouts that the circuit is specifically designed for. The said circuitry may also include means for signal level adaption where the signal amplitude and/or envelope is adapted, to or from the host system controlling entities, e.g. ASIC or FPGA. Furthermore, the circuitry may include the capacity to re-route high speed signals such as, but not limited to, 1/10/25 Gbps ethernet signals and/or 3/12/24 Gbps SDI signals as well as low speed or static signals to/from same connector pin on the module to/from e.g. the ASIC or FPGA device on the host system.

As a first step for enabling the use of different types of pluggable modules in a module port of a host system, the electrical interface of the module is detected, which may for example be done by the adaptation device or circuitry, typically the detection circuitry of the adaptation device. Detection of electrical interface of the inserted module may be implemented by means of detection of characteristic signal pins in the module, such as power pins or signal pins at which a difference in AC or DC resistance can be measured by a designated circuitry. This detection circuitry may set the mode of operation of the re-routing and adaptation circuitry directly, or report the type detected to a controlling entity of the host system which then can set the mode of operation of said adaptation circuitry.

In another embodiment, the module type is first detected, for example by a controlling entity of the host system, and then the electrical interface is determined based on said module type, e.g. using a lookup table linking a type of device to a certain electrical interface. Thus, alternatively, the module type can be identified by means of an internal memory in the module, such as an electrically erasable programmable read-only memory (EEPROM), which is a type of non-volatile memory used in computers, integrated in microcontrollers for smart cards and remote keyless systems, and other electronic devices to store relatively small amounts of data but allowing individual bytes to be erased and reprogrammed. The internal memory of the module is read by a controlling entity in the host system each time a module is inserted, and information regarding the type of module is obtained and the type of module identified/determined. The type of module may thus be determined by reading an internal memory of the inserted module, e.g. a serial number, article number or index number may be read from the memory, which number indicates the type of module and hence the electrical interface by determining a correlation between said number and an electrical interface using e.g. a lookup table, where the table may be stored in the memory of the host system. This information is then used by the host system to set the proper mode of operation of the re-routing and adaption circuitry. Setting a mode of operation relates to selecting one of a plurality of possible re-routings and signal adaptations which the adaptation circuitry is designed for, corresponding to one of the pinouts/module interface types that the circuitry is being adapted to.

Embodiments of the present inventive method are preferably implemented, but not limited to, host systems for communication using pluggable optical or electrical transceiver modules such as SFP, SFP+ or VSFP modules or similar. According to one embodiment of the invention, a range of three module types, which all uses the SFP mechanical form factor and host connector, can be used in the same module port. These are SFP (MSA pinout), VSFP (non-MSA pinout, with dual RX and TX pairs) and SFP+ (MSA pinout).

The invention will now be described with reference to various embodiments implemented in a host system, where the term host system is utilized broadly to include any such device as a router, switch or gateway etc., that is utilized to implement connectivity within a network for transmission of signals carrying information such as data, video, sound, synchronization information and similar.

FIG. 1 depicts a general overview of the present invention according to an embodiment. A host system (100) comprising one or more controlling entities (120) and one or more module ports (50) is provided. The host system may comprise one or more adaptation devices (10) of the invention. A pluggable module (40) is inserted into a module port (50) and information indicating the electrical interface of the pluggable module may be obtained. The information indicating the electrical interface of the module inserted may be obtained or determined by a detection circuitry of the adaptation device (10), which detects characteristic signal pins in the module to determine the electrical interface of the module. A mode of operation may then be set by the detection circuitry of the adaptation device (10) based on the determined type of pluggable module (40). Alternatively, information relating to the type of pluggable module inserted and thus corresponding electrical interface may be obtained or determined by the controlling entity (120) of the host system (100) by reading an internal memory of the pluggable module (40), correlating the information from the internal memory to an electrical interface, and the mode of operation may then be set based on the electrical interface of the pluggable module inserted. Thus, the port (50) may also communicate directly with the controlling entity (120). The adaptation device (10) may be comprised within the port (50), or alternatively be a part of the pluggable module (40) (not shown).

Even though depicted as separate entities, the adaptation device (10) may be incorporated in the port (50). In yet another embodiment, the adaptation device (10) may be incorporated in the pluggable module (40).

Figure 2:
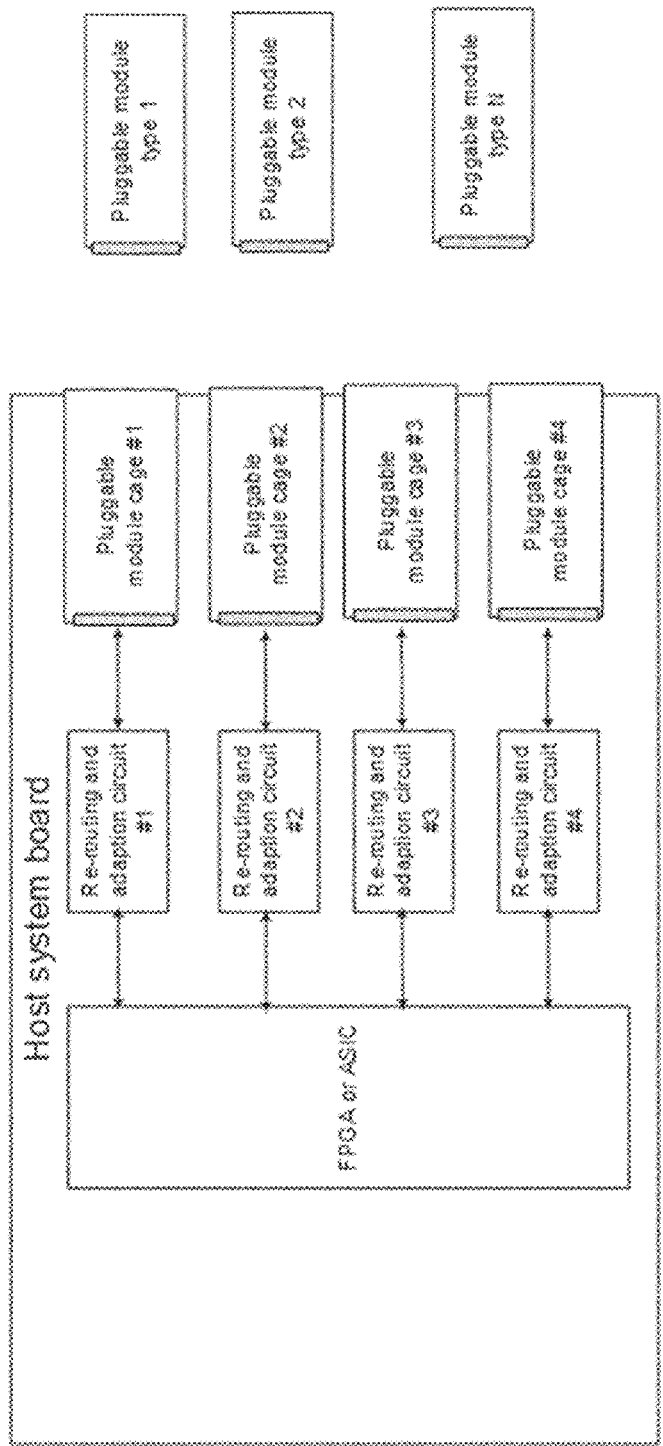
FIG. 2 is a block diagram showing a principal structure of a host system board comprising multiple adaptive ports.

FIG. 2 discloses an embodiment of the invention, and depicts a principal diagram of a host system board which comprises multiple pluggable module cages (corresponding to the module ports (50) of FIG. 1), typically implemented according to the SFP (Small Form factor Pluggable) mechanical standard and host connector type. The host system board (corresponding to the host system (100) of FIG. 1) comprises an ASIC or FPGA (corresponding to the controlling entities (120) of FIG. 1), which is capable of transmitting and receiving high speed data signals, such as Ethernet or SDI video signals. The host system FPGA or ASIC also controls a set of low speed I/O signals for management of the SFP modules, such as TX-Disable, LOS (Loss Of Signal), TX-Fault, RS0, RS1, Module-present (MOD_DEF0) and I2C-bus (MOD_DEF1, MOD_DEF2). The I2C-bus may be used to read the internal memory (EEPROM) in the module, as well as other status registers. Re-routing and adaptation circuits (corresponding to the adaptation device (10) of FIG. 1) may be implemented in the host system board for re-routing and adapting the signals between the pluggable module and the FPGA or ASIC. Thus, regardless of the outline of the pluggable module cages, any module type may be used in the pluggable module cages, hence avoiding the need of several different types of pluggable module cages for each type of pluggable module.

The controlling entities of the host system, such as FPGA or ASIC, may further comprise processing means for the processing of data sent and received, which could include processing such as packet embedding/de-embedding, switching, encryption/decryption in conjunction with video compression or transcoding etc. In such a system it would thus be desirable to implement a module port that may be dynamically configured and/or programmable to accept either video data (SDI) or packet data (Ethernet) on any port. However, SDI data are commonly interfaced using the module type called VSFP which is inherently incompatible with modules used for packet data such as SFP or SFP+. Thus, some adaptation of the signaling must be performed if using a generic module port for different types of pluggable modules.

Figure 3A:
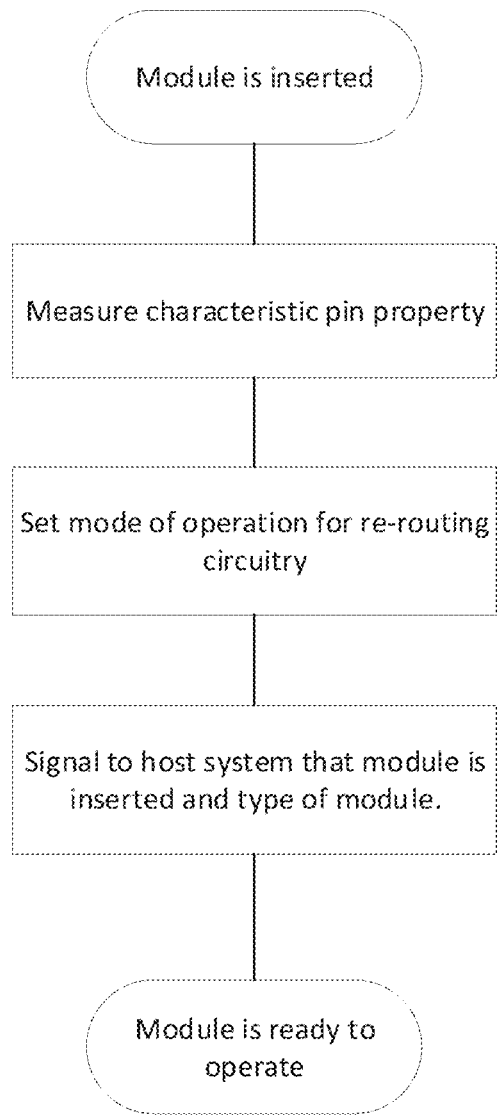
FIG. 3 is a flow chart diagram showing three alternative processes, 3A, 3B and 3C, of identifying the electrical interface of the module type and selecting the mode of operation.
Figure 3B:
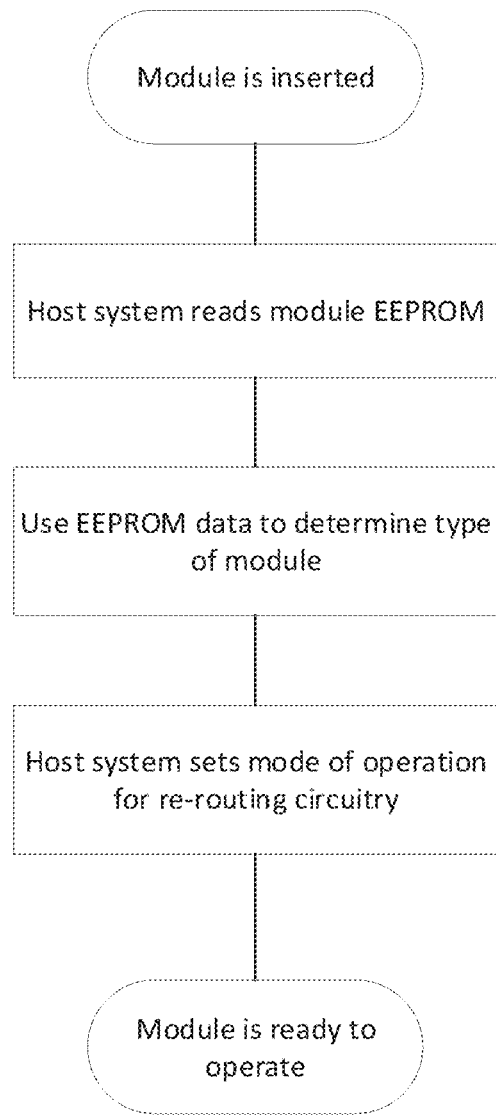
Figure 3C:
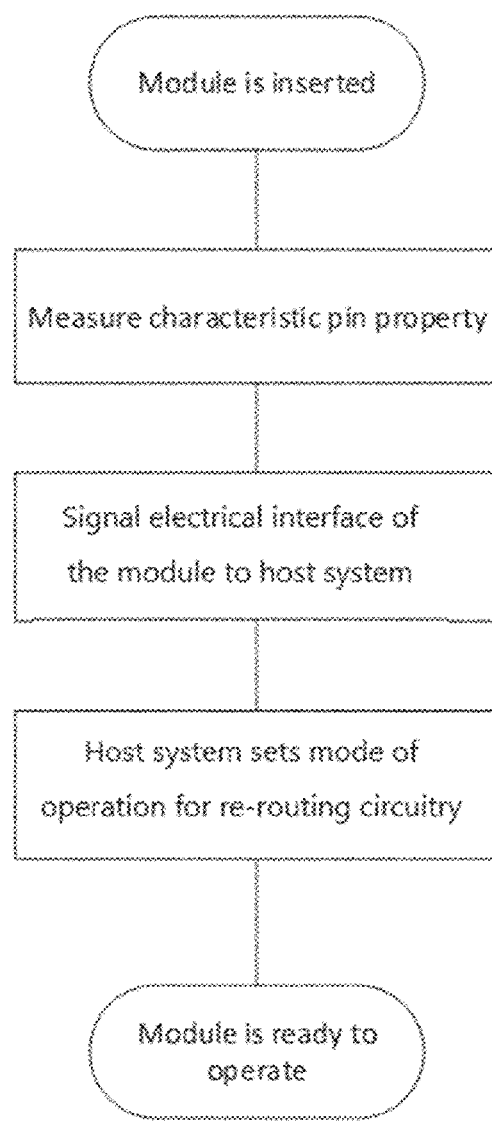

FIG. 3 shows flowchart diagrams of example processes of the invention. FIG. 3A shows a process where a module is inserted, e.g. into a module port of a host system, and the characteristic pin property of the pluggable module is measured, determined or detected, e.g. by a detection circuitry of an adaptation device. The mode of operation for the re-routing circuitry (adaptation circuitry of the adaptation device) is set by the detection circuitry based on the electrical interface of the module inserted, and it is communicated to the host system that a pluggable module is inserted, the electrical interface of the module inserted, and the mode of operation set. Alternatively, as shown in FIG. 3C, the detection circuitry communicates the detected electrical interface of the inserted module to a controlling entity of the host system, which sets the mode of operation based on said received information. The module is now ready to be used for transceiving signals between the pluggable module and the controlling entities of the host system. FIG. 3B shows a process where a module is inserted, e.g. into a module port of a host system, and the internal memory (EEPROM) of the module is read by the controlling entities of the host system, and used to determine the type of pluggable module inserted, which may be linked to the electrical interface of said module. The host system then sets the mode of operations for the re-routing circuitry (adaptation circuitry of the adaptation device) based on the corresponding electrical interface of the module type of the inserted module. The module is now ready to be used for transceiving signals between the pluggable module and the controlling entities of the host system.

In one example, upon insertion of a pluggable module, the detection circuit may detect the type of SFP module by sensing pin no. 7 to determine what type of module pinout/interface that has been plugged in the SFP slot. Pin 7 is grounded within the module in VSFP modules, while being an input with weak pull-up in MSA SFP modules. By putting an external strong pull-up, this signal is used as an SFP type signal (*VSFP_MODE) which indicates a VSFP module when LOW. Thus, the signal is based on the electrical interface of the module that is plugged in. This signal then controls the mode of operation of the re-routing circuitry (adaptation circuitry of adaptation device). FIGS. 3A and 3C show example flowchart diagrams using this process.

As described above, the type of module and its electrical interface may be determined for example based on the pin characteristics or by reading an internal memory of the pluggable module. One example embodiment using the pin characteristics to determine the type/electrical interface of the pluggable module is described in the following. In order to determine if the pluggable module is an SFP or an SFP+, the MOD_DEF0 signal is used to lock a D-latch that stores the state of the RS0 pin at SFP insertion. The stored state tells the circuit if the module is an SFP or SFP+ module creating a signal (*SFPP) which is LOW when an SFP+ module is inserted, and HIGH when an SFP module is inserted, which correlates to the electrical interface of the modules.

The re-routing and adaption circuitry (adaptation circuitry of adaptation device) of this embodiment of the invention adapts all three host pinouts, as seen in FIG. 6, to a common signal set towards the ASIC or FPGA of the host system. The mode of operation of the circuit may be controlled by the signals *VSFP_MODE and *SFPP as described below.

Module signal pins 2, 3 is routed to the host system ASIC or FPGA signal pair RX2-/RX2+ when *VSFP_MODE signal is LOW, to TX_Fault, TX_Disable when *VSFP_MODE signal is HIGH. This is implemented by means of switch devices capable of passing both low speed and high-speed signals. Module signal pin 4 is connected to Vee when *VSFP_MODE signal is LOW, to host system ASIC or FPGA signal SDA when VSFP_MODE signal is HIGH. This is implemented by means of bi-directional switch devices. Module signal pin 6 is routed to the host system ASIC or FPGA signal SDA when *VSFP_MODE signal is LOW, to host system signal *SFP_PRESENT when *VSFP_MODE signal is HIGH. This is implemented by means of bi-directional switch devices. Module signal pin 7 is connected to Vee when *VSFP_MODE signal is LOW, to host system signal RS0 when *VSFP_MODE signal is HIGH. This is implemented by means of bi-directional switch devices. Module signal pins 8, 9 is routed to the host system ASIC or FPGA signal pair TX2-/TX2+ when *VSFP_MODE signal is LOW, to the host system ASIC or FPGA signal LOS and RS1 when *VSFP_MODE signal is HIGH and the signal *SFPP is high. However, if the signal *VSFP_MODE signal is HIGH and the signal *SFPP is LOW, pin 9 is connected to Vee instead. This is implemented by means of switch devices capable of passing both low speed and high-speed signals. Module signal pin 10 is connected the host system ASIC or FPGA signal TX2_DIS when *VSFP_MODE signal is LOW, to Vee when *VSFP_MODE signal is HIGH. This is implemented by means of bi-directional switch devices. Module signal pin 20 is connected the host system ASIC or FPGA signal TX1_DIS when *VSFP_MODE signal is LOW, to Vee when *VSFP_MODE signal is HIGH. This is implemented by means of bi-directional switch devices.

In another embodiment of the invention, the detection of the module type and electrical interface is done by means of an internal memory in the module (EEPROM) which is read by a controlling entity in the host system each time a module is inserted. The information from the EEPROM is then used by the host system to determine the type of interface of the module and set the proper mode of operation of the re-routing and adaption circuitry. FIG. 3B shows a flowchart of this process.

In a third embodiment of the invention (not depicted) is provided a pluggable module where the adaptation circuitry (re-routing and adaption circuitry), as previously described, is built into a module so that the module can act as an adaptive module port to other types of modules.

FIG. 4 shows the host interface connector used for VSFP, SFP and SFP+ modules from top view, bottom view and from the side view, including the pins 1-20. SFP modules are used for data rates up to 3.2 Gbps, while SFP+ modules are used up to 16 Gbps. The pinout of SFP and SFP+ are defined in a specification commonly called SFP-MSA (SFP Multi Source Agreement). This connector is also adopted for the third type of module called VSFP (Video-SFP) for which the pinout is re-defined to carry two additional TX and RX channels instead of the signals TX_Fault, TX_Disable, LOS, RS1. VSFPs are used for transport of SDI (Serial Digital Interface) signals up to 12 Gbps. The three different pinouts for SFP, SFP+, VSFP are shown in the table of FIG. 6.

Figure 5:
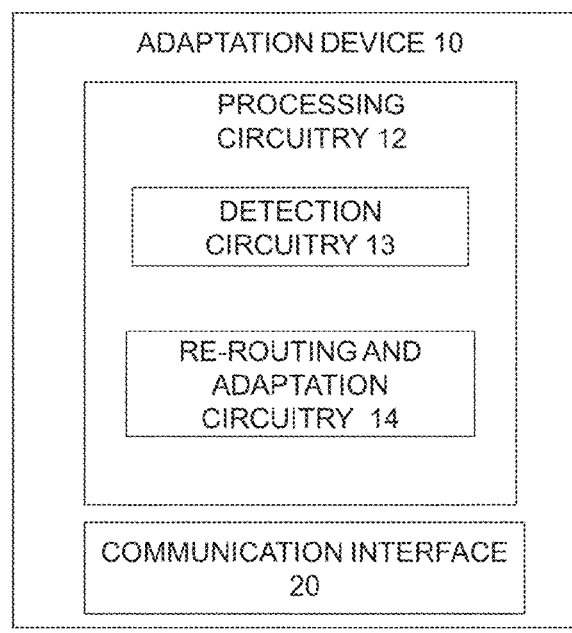
FIG. 5 is block diagram of an example adaptation device of the present disclosure

A block diagram of the adaptation device (10) of the present disclosure is shown in FIG. 5. The adaptation device may comprise processing circuitry (12) and a communication interface (20), wherein the processing circuitry may be said to comprise detection circuitry (13), which detects the type of inserted pluggable module and corresponding electrical interface based on the pin characteristics of the pluggable module, and sets a mode of operation based on the detected information, and adaptation circuitry (14), where the adaptation circuitry of the adaptation device uses said mode of operation for adapting and re-routing signals between a pluggable module and for example a controlling entity of a host system. The adaptation device may be integrated within a host system or be provided separately e.g. for insertion into for example a host system or similar. The adaptation device may be integrated in the module port of a host system, or in the pluggable module itself. It should be appreciated that the processing circuitry need not be provided as a single unit but is according to some aspects provided as any number of units or circuitry.

FIG. 6, as mentioned above, is a table showing pin characteristics for different types of pluggable modules, indicating if they need re-routing and/or signal adaptation, and host system FPGA or ASIC signal alternatives.

The proposed methods according to a first and second embodiment will now be described in more detail referring to FIG. 7. It should be appreciated that FIG. 7 comprises some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed.

Figure 7:
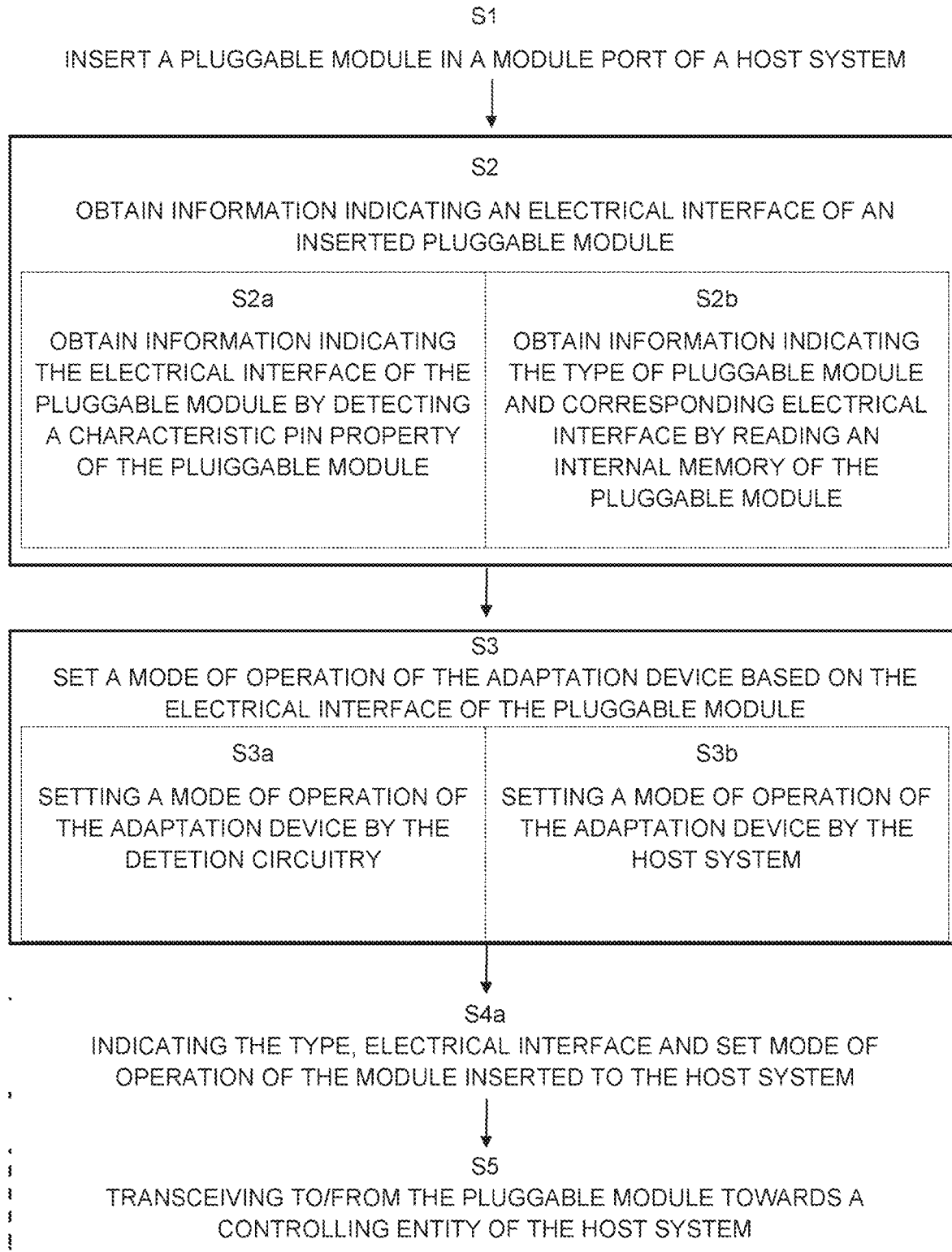
FIG. 7 shows a flowchart of an exemplary process for enabling the use of a pluggable module in a host system.

FIG. 7 illustrates a method, for enabling use of a pluggable module in a host system, wherein the host system comprises an adaptation device, the method comprising the steps of: inserting (S1) a pluggable module in a module port of a host system, obtaining information (S2) indicating an electrical interface of pluggable module, and setting (S3) a mode of operation of the adaptation device for re-routing and adapting signals to/from the pluggable module towards one or more controlling entities of the host system based on the electrical interface of the pluggable module. In one aspect, the method further comprises transceiving (S5) to/from the pluggable module towards one or more controlling entities of the host system via the adaptation device using the set mode of operation of the adaptation device. Thus, the set mode of operation of the adaptation device is used to re-route and/or adapt signals between the pluggable module and the controlling entities of the host system via the adaptation device, thus enabling use of the pluggable module in the host system. The method enables use of a pluggable module of any type in the host system, regardless of the module ports present in the host system.

In one embodiment, the method of obtaining information (S2) indicating an electrical interface of the pluggable module comprises obtaining information (S2a) indicating the electrical interface of the pluggable module by detecting a characteristic pin property of the pluggable module using a detection circuitry, wherein detecting characteristic pin property of the pluggable module may include detection of characteristic signal pins in the module, such as power pins or signal pins, at which a difference in AC or DC resistance can be measured by the detection circuitry. Upon identifying the electrical interface of the pluggable module inserted, the mode of operation of the adaptation device is set (S3a) by the detection circuitry. As an alternative, the mode of operation of the adaptation device is set (S3b) by a controlling entity of the host system. The detection circuitry may indicate (signal/communicate) (S3b1) the obtained/detected electrical interface to a controlling entity (step not shown in figure), and the controlling entity may set (S3b2) the mode of operation. When performing step S3a above, the method may further comprise indicating (S4a) to the host system one or more of that a pluggable module has been inserted, to which type of module the inserted pluggable module belongs, the corresponding electrical interface of the module and the set mode of operation of the adaptation device.

In a further embodiment, the method of obtaining information (S2) indicating an electrical interface of the pluggable module comprises obtaining information (S2b) indicating the electrical interface by obtaining the type of pluggable module by reading (S2b1) an internal memory of the pluggable module using a controlling entity of the host system. The obtained information regarding the type of module, or related number in the stored internal memory of the module, may then be linked to a corresponding electrical interface, e.g. by the use of a lookup table for correlating (S2b2) the obtained information, such as a serial number, article number or index number, to a corresponding electrical interface. The correlation may be performed by the controlling entity which read the internal memory, by using a lookup table stored in the memory of the host system. The method further comprises setting (S3b) by the controlling entity of the host system a mode of operation for the adaptation device based on the electrical interface of the inserted pluggable module. The method then enables transceiving (S5) to/from the pluggable module towards a controlling entity of the host system using the set mode of operation.

The present disclosure further provides an adaptation device (10) comprising processing circuitry (12) configured to enable use of a pluggable module (40) in a host system (100), and being capable of re-routing and adapting signals from a pluggable module (40) inserted into a module port (50) of the host system (100) to at least one controlling entity (120) of the host system (100), the device (10) comprising: a communication interface (20); processing circuitry (12) comprising detection circuitry (13) and adaptation circuitry (14) configured to cause the adaptation device (10): to obtain information indicating an electrical interface of a pluggable module being inserted into a module port of a host system; to set a mode of operation for the adaptation circuitry for re-routing and adapting signals to/from the pluggable module towards one or more controlling entities of the host system based on the indicated electrical interface of the pluggable module. The adaptation device (10) may further be configured to transceive to/from the pluggable module towards one or more controlling entities of the host system using the set mode of operation of the adaptation device. The module may communicate with several controlling entities of the host system, but only interact with one controlling entity at a time.

In one embodiment, the processing circuitry (12), such as the detection circuitry of the processing circuitry (13), is configured to obtain information indicating an electrical interface of the pluggable module (40) being inserted into a module port (50) of a host system (100). Accordingly, to obtain information indicating the electrical interface of the pluggable module is performed by detecting a characteristic pin property of the pluggable module using the detection circuitry (13). For example, to detect characteristic pin property of the pluggable module includes to detect characteristic signal pins in the module, such as power pins or signal pins, at which a difference in AC or DC resistance can be measured by the detection circuitry. The apparatus further may be configured to set a mode of operation of the adaptation device (10) for re-routing and adapting signals to/from the pluggable module towards one or more controlling entities of the host system based on the electrical interface of the pluggable module using the detection circuitry (13). The apparatus may be further configured to indicate to the host system that a pluggable module has been inserted, and to indicate to which type and corresponding electrical interface the inserted pluggable module belongs, and possibly also the set mode of operation.

In another embodiment, the adaptation device (10) being configured to obtain information indicating an electrical interface of a pluggable module being inserted into a module port of a host system comprises to obtain information indicating the electrical interface of the pluggable module by reading, by the controlling entity (120) of the host system (100), an internal memory of the pluggable module (40). The memory may comprise a certain number which may be liked to a type of module or type of electrical interface. The device (10) may be further be configured to set a mode of operation of the adaptation device for re-routing and adapting signals to/from the pluggable module towards one or more controlling entities of the host system (100) based on the electrical interface of pluggable module (40), which comprises to set, by a controlling entity (120) of the host system (100), a mode of operation for the adaptation device (10).

The disclosure further provides a host system (100) comprising the adaptation device (10), the host system further comprising one or more module ports (50) and one or more host controlling entities (120).

The disclosure further provides a pluggable module (40) comprising the adaptation device (10) of the present disclosure, wherein the adaptation device re-routes and adapts signaling between the pluggable module and e.g. a host system to which the module is plugged in. The detection of the electrical interface and setting of mode of operation may function similarly as when the adaption device is present in the host system.

Thus, the adaptation device may either be part of a module of its own, be present in a line card or directly present in a host system. The adaptation device may be produced as an integrated circuit (IC) or a chip, or may be made of different circuits connected to each other.

The host system of the present disclosure may be a router, network switch, network gateway or host computer, and the one or more controlling entities of the host system typically is constituted of a central processing unit (CPU), which may be separate or comprised in an FGPA or ASIC device. The module port of the host system may comprise a module cage and a host interface connector, and the pluggable module may be selected from an SFP, SFP+, VSFP QSFP, QSFP28, QSFP-DD, CFP2-4, CFP2-8, CFP4, GPS receivers, and packet or video processing engines. The mode of operation of the adaptation device may include ways to re-route signals to appropriate pins on the host interface connector of the system, or ways to re-route high speed signals and/or low speed or static signals to/from a same connector pin on the module to/from a host system controlling entity, and to perform signal level adaption, such as signal amplitude and/or envelope adaptation.

The content of this disclosure thus enables use of a pluggable module of any type in any module port of a host system, due to the adaptation device acting as an integrated physical adapter between the pluggable module, i.e. the electrical interface of the module port where the pluggable module is inserted, and the host interface of the host controlling entities.

Accordingly, there is provided a method and apparatus/device with which a host system with pluggable modules ports comprising an electrical interface can adapt the physical signal configuration of the pluggable module ports to accept a multitude of incompatible signal pin configurations of the host interface, depending of which type of module is plugged in to the port. The invention includes methods for detecting type and electrical interface of module, by detecting characteristic signal pins in the module interface or alternatively by reading an onboard memory in the module, as well as an adaptation apparatus comprising adaption circuitry capable of physically re-routing signals of the host interface connector, as well as adapting the signal levels in order to adapt the host interface to the electrical interface of the inserted module type.

The present disclosure thus provides an apparatus or device comprising a module port and circuitry which accepts different types of modules with different electrical interfaces (i.e., electrical signal sets and/or pinouts) to be used in the same physical port), for example by detecting type of said module's electrical interface (based on different electrical signal sets or said different pinouts), and based on said type of module's electrical interface, perform actions to adapt the electrical interface of the host system towards the different module interfaces by re-routing and/or adapting the signals (adapting signal levels and/or signal envelope) passing between the host system ASIC or FPGA to/from the module connector to the host interface pinout of the type of module inserted.

The host system of the present disclosure may be a networking system. Detecting the module electrical interface may be performed by detecting a set pinout of the inserted module, or by detecting different electrical signal sets of the inserted module. Accordingly, the type of module, i.e. the type of module's electrical interface, may be detected by means of measuring the characteristic pin property, signal pins on the inserted module, such as power pins or signal pins of which a difference in AC or DC resistance can be measured by a designated circuitry. The detection circuitry may then directly set a mode of operation of the re-routing and adaption circuitry to which type of module host interface pinout to adapt, as is the method of FIG. 3A. Alternatively, the signals from the detection circuitry may be read by a controlling entity in the host system, which then sets the mode of operation of the re-routing and adaption circuitry to which type of module host interface pinout to adapt, as in the method of FIG. 3C.

In another embodiment, the device or apparatus may comprise a module port circuitry as described above, where the type of pinout, and/or module type, is detected by means of an internal memory in the module (EEPROM) which is read by a controlling entity of the host system each time a module is inserted, and where a controlling entity of the host system sets the mode of operation of the re-routing and adaption circuitry, based on the information read from the internal memory (EEPROM), which is correlated to an electrical interface of the module, as in the method of FIG. 3B.

The re-routing and adaption circuitry of the invention has the capacity to re-route a range of signals in the signal set of the host system CPU, FPGA or ASIC and connect these to different pins in the module connector, depending on a set mode of operation. For example, the re-routing and adaption circuitry include the capacity to re-route high speed signals such as, but not limited to, 1/10/25/100 Gbps ethernet signals and/or 3/12/24 Gbps SDI signals, as well as low speed or static signals to/from same connector pins on the module to/from the ASIC or FPGA device on the host system.

The module port and circuitry of the present disclosure includes module ports designed for both optical or electrical modules, and for transmitting or receiving analog or digital signals. In one embodiment, the module port is a cage where the connector is designed for modules mechanical compatible with SFP or SFP+ multi source agreement (MSA) [INF-8074i], [SFF-8431]. Further, the module port circuitry may be capable of accepting and adapting the host connector pinout to modules with MSA pinouts for SFP and SFP+ modules, as well as non-MSA pinouts for VSFP modules, according to FIG. 6.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, and systems. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware.

In all embodiments of the invention there is a common aspect that the method and circuitry only detects the type of physical interface (pinout and signal set) of the host interface and only applies an adaption of the physical layer of the host interface towards the pluggable module, thus being independent of all other aspects such as external interface type of the pluggable module (electrical or optical etc.), or type of protocol (Ethernet, Fiber channel, SDI etc.) or other specific hard or soft features of the module. Hence should this invention not be considered to be disclosed by or infringing any other method that implements adaption of the signaling to/from pluggable modules by detecting supported transport protocols or similar features which are not of purely physical nature.

Even though the invention has been described in relation to embodiments disclosing certain module types, it would be possible for the person skilled in the art, based on the present disclosure, to apply the present invention of detection of a module type and adaptation of the physical layer parameter of the host interface towards the module for any module type, even if not specifically disclosed in the present disclosure. Also, the specific implementation within a host system, or within the pluggable module itself, of the adaptation device should not be seen as limiting, since these are just example embodiments and the adaptation device may have other possible implementations.

The person skilled in the art realizes that the present invention by no means is limited to the embodiments described above. On the contrary, many modifications and variations are possible within the scope of the appended claims which should be considered to be applicable to any range of pluggable modules sharing mechanical package and compatible connector while defining more than one signal set and/or pinout for the module connector. For example, embodiments of the invention may be based on other module types including, but not limited to, QSFP, QSFP28, QSFP-DD, CFP2-4, CFP2-8, CFP4, as well as any type of modules with active signal processing such as GPS receivers, packet or video processing engines etc.

The invention claimed is:

1. A method for use in a host system, for enabling use of a pluggable module in the host system, wherein the host system comprises an adaptation device, the method comprising:

inserting the pluggable module in a module port of the host system;
obtaining information indicating an electrical interface of the pluggable module, wherein obtaining information comprises one or more of
i) detecting a characteristic pin property, set pinout or electrical signal set of the pluggable module using a detection circuitry, and
ii) indicating the electrical interface of the pluggable module by reading an internal memory of the pluggable module indicating a type of pluggable module and correlating the type of pluggable module to the electrical interface of the pluggable module, where the internal memory is read by a controlling entity of the host system; and
setting a mode of operation of the adaptation device for re-routing and adapting signals to/from the pluggable module towards one or more controlling entities of the host system based on the electrical interface of the pluggable module; and
transceiving to/from the pluggable module towards the one or more controlling entities of the host system based on re-routing and adapting signals via the adaptation device using the set mode of operation of the adaptation device.

2. The method according to claim 1, wherein detecting the characteristic pin property of the pluggable module includes detection of characteristic signal pins in the pluggable module, such as power pins or signal pins, at which a difference in AC or DC resistance can be measured by the detection circuitry.

3. The method of claim 2, wherein setting the mode of operation of the adaptation device for re-routing and adapting signals to/from the pluggable module towards the one or more controlling entities of the host system based on the electrical interface of the pluggable module comprises setting the mode of operation of the adaptation device using the detection circuitry or setting the mode of operation of the adaptation device using the or more controlling entities of the host system, including indicating the one or more controlling entities the electrical interface of the pluggable module using the detection circuitry, and setting the mode of operation using the one or more controlling entities based on the indicated electrical interface.

4. The method according to claim 1, further comprising indicating to the host system that the pluggable module has been inserted, the electrical interface of the pluggable module inserted, and the set mode of operation of the adaptation device.

5. The method according to claim 1, wherein setting the mode of operation of the adaptation device for re-routing and adapting signals to/from the pluggable module towards the one or more controlling entities of the host system based on the electrical interface of the pluggable module comprises setting by the host system a mode of operation for the adaptation device.

6. An adaptation device, comprising processing circuitry configured to enable use of a pluggable module in a host system, and being capable of re-routing and adapting signals from the pluggable module inserted into a module port of the host system to at least one controlling entity of the host system, the adaptation device comprising:
a communication interface;
detection circuitry; and
adaptation circuitry configured to cause the adaptation device:
to obtain information indicating an electrical interface of the pluggable module being inserted into the module port of the host system, wherein to obtain information co rises one or more of
i) to obtain information indicating the electrical interface of the pluggable module by detecting a characteristic pin property, set pinout or electrical signal set of the pluggable module using the detection circuitry, and
ii) to read, using a controlling entity of the host system, an internal memory of the pluggable module indicating a type of pluggable module and to correlate the type of pluggable module to the electrical interface of the pluggable module;
to set a mode of operation for the adaptation circuitry for re-routing and adapting signals to/from the pluggable module towards one or more controlling entities of the host system based on the indicated electrical interface of the pluggable module; and
to transceive to/from the pluggable module towards the one or more controlling entities of the host system based on re-routing and adapting signals via the adaptation device using the set mode of operation of the adaptation device, wherein the set mode of operation of the adaptation device indicates how to re-route and/or adapt signals using the adaptation circuitry of the adaptation device.

7. The adaptation device according to claim 6, wherein to detect the characteristic pin property of the pluggable module include to detect characteristic signal pins in the pluggable module, such as power pins or signal pins, at which a difference in AC or DC resistance can be measured by the detection circuitry.

8. The adaptation device according to claim 6, wherein to set a mode of operation of the adaptation device for re-routing and adapting signals to/from the pluggable module towards the one or more controlling entities of the host system based on the electrical interface of the pluggable module comprises to set the mode of operation of the adaptation device using the detection circuitry.

9. The adaptation device according to claim 6, further configured to indicate to the host system that the pluggable module has been inserted and the electrical interface of the pluggable module inserted.

10. The adaptation device according to claim 6, wherein to set a mode of operation of the adaptation device for re-routing and adapting signals to/from the pluggable module towards the one or more controlling entities of the host system based on the electrical interface of the pluggable module comprises to set, using the one or more controlling entities of the host system, a mode of operation for the adaptation device.

11. A host system comprising the adaptation device of claim 6, the host system further comprising one or more module ports and one or more host controlling entities.

12. A pluggable module comprising the adaptation device of claim 6.

13. The method according to claim 1, wherein the host system is a router, network switch, network gateway, video router or host computer, and wherein the one or more controlling entities of the host system is a CPU, where the CPU may be comprised in a FGPA or ASIC.

14. The method according to claim 1, wherein the module port comprises a module cage and a host interface connector.

15. The method according to claim 1, wherein the pluggable module is selected from an SFP, SFP+, VSFP QSFP, QSFP28, QSFP-DD, CFP2-4, CFP2-8, CFP4, GPS receivers, and packet or video processing engines, and wherein the mode of operation includes information indicating how to re-route and adapt signals of a host interface of the host system to the electrical interface a module type of the pluggable module.

* * * * *